United States Patent [19]

Shih

[11] Patent Number: 5,130,388

[45] Date of Patent: Jul. 14, 1992

[54] PRECIPITATION POLYMERIZATION PROCESS

[75] Inventor: Jenn S. Shih, Paramus, N.J.

[73] Assignee: ISP Investments Inc., Wilmington, Del.

[21] Appl. No.: 696,474

[22] Filed: May 6, 1991

[51] Int. Cl.$^5$ .............. C08F 4/38; C08F 26/10; C08F 26/12
[52] U.S. Cl. .................... 526/228; 526/264
[58] Field of Search ................ 526/264, 228

[56] References Cited

U.S. PATENT DOCUMENTS

| | | | |
|---|---|---|---|
| 3,932,372 | 1/1976 | Lewis et al. | 526/228 |
| 4,182,851 | 1/1980 | Straubet et al. | 526/264 |
| 5,015,708 | 5/1991 | Shih et al. | 526/264 |
| 5,073,614 | 12/1991 | Shih et al. | 526/264 |

Primary Examiner—Joseph L. Schofer
Assistant Examiner—Alex H. Walker
Attorney, Agent, or Firm—Marilyn J. Maue; Joshua J. Ward

[57] ABSTRACT

This invention relates to the polymerization of a monomer capable of forming a precipitate of polymerized particles which comprises reacting in the liquid phase said monomer in the presence of a high temperature, free radical initiator at a temperature within a critical range of between about 110° and 150° C. to produce a particulate polymeric product having a glass transition temperature. (Tg) in excess of the temperature at which polymerization is effected and having a residual monomer content less than 1,000 ppm.

12 Claims, No Drawings

PRECIPITATION POLYMERIZATION PROCESS

BACKGROUND OF THE INVENTION

Many monomers and monomeric mixtures capable of forming polymeric precipitates are known as well as the preparation of their polymeric products by reacting the monomers in aqueous or organic liquid media or in a Redox system. However, these processes, as described in the prior art, have many disadvantages and objectionable side effects among which are relatively low yields of pure polymeric product and polymers which are generally colored or subject to discoloration due to the presence of residual monomer. Also, many of these prior processes produce products in the form of gels or gummy gelatinous materials which are difficult to handle and from which the polymer is not easily isolated. Although homogeneous polymerization processes have achieved low residual monomer content, the product produced, often a flammable product solution, is gummy or highly viscous and polymeric product recovery very difficult as opposed to heterogeneous systems where the product is directly recovered as a precipitate. However, substantially all of the prior heterogeneous methods have been unable to produce a product in which the objectionable and contaminating monomeric residue is reduced to less than 0.1% (1,000 ppm). Reduction to practically exclusion of the monomer, e.g. to less than 1,000 ppm, is the desired goal of research since entrained monomeric moieties, even in small quantities, noticeably degrade polymeric properties, and in some instances, may have a carcinogenic effect which is particularly objectionable when the polymer is used in cosmetic and biological formulations. Finally, many of the prior polymerizations produce low molecular weight products since they are carried out under conditions which provide a short propagation stage resulting from the formation of a highly viscous reaction mixture thus hindering agitation and tending to terminate the reaction. In the Redox system for polymerization of acrylic acid/lactam monomers, it has been found that only certain proportions of monomer and comonomer produce commercially acceptable yields and that when the lactam is present in excess, the conversion to copolymer is less than 60%.

Accordingly, it is an object of this invention to overcome the above deficiencies by providing a commercially feasible and economical process for the precipitation polymerization of monomers.

Another object of this invention is to provide a process for producing polymer containing significantly less than 0.1 weight % residual monomer.

Still another object is to provide a commercially acceptable process for producing particulate copolymers and terpolymers from any proportion of monomeric mixtures.

Another object is to produce finally divided colorless products containing not more than 500 ppm residual monomer.

These and other objects of the invention will become apparent from the following description and disclosure.

THE INVENTION

In accordance with this invention there is provided a heterogeneous, liquid phase process which comprises contacting a solution of a polymerizably precipitatable monomer or monomeric mixture with an initiating amount of a high temperature, free radical initiator having at least a 10 hour half life at 100° C. and polymerizing the resulting mixture at a temperature of from about 110° C. to about 150° C. while maintaining vigorous agitation and an oxygen free, anhydrous atmosphere throughout the reaction to produce a particulate polymer containing less than 0.1% (1,000 ppm) lactam residual monomer and having a glass transition temperature (Tg) in excess of the temperature at which polymerization is effected.

The precipitatable monomers useful in this invention are polar compounds whose polymers have a Tg greater than 110° C. which include individual monomers as well as monomeric mixtures whose copolymeric products possess an equally high Tg. Examples of homopolymerizable monomers included in this invention are N-vinylpyrrolidone, alkyl substituted N-vinylpyrrolidones, N-vinyl caprolactam, alkyl substituted N-vinyl caprolactams, acrylic acid, methacrylic acid, acrylamide, methacrylamide, etc. Copolymers within this group are also suitable candidates for the present high temperature polymerization reaction. Additionally, nonpolar monomers, when used in an amount less than 30% of the total monomer content, can be included to form a monomeric mixture whose copolymers have certain desirable properties. These monomers, preferably employed in an amount not more than about 20%, include styrene, tetrafluoroethylene, isoprene, ethylene, isopropylene, isobutylene, acrylonitrile, $C_1$ to $C_4$ alkyl acrylate or methacrylate, vinyl chloride, vinyl acetate, N,N-dimethylamino $C_1$ to $C_4$ alkyl acrylates or methacrylates and the like. Suitable comonomers may also include cross-linking agents such as the divinyl ether of diethylene glycol, N,N-divinyl-imidazolidone, pentaerythritol triallyl ether, triallyl-1,3,5-triazine-2,4,6-(1H,3H,5H) trione, ethylene glycol diacrylate, 2,4,6-triallyloxy-1,3,5-triazine, 1,7-octadiene, 1,9-decadiene, divinyl benzene, methylene bis(acrylamide), ethylene bis(methacrylamide) and the like.

In the process of this invention the monomer or monomeric mixture is predissolved in from about 50 to about 90 wt. %, preferably from about 70 to about 85 wt. % of a nonpolar solvent for introduction into the reactor. Suitable solvents include cyclohexane, heptane, benzene, toluene, xylene, ethyl benzene, and linear, branched or cylic alkanes having from 2 to 20 carbon atoms.

For the purposes of this invention, high temperature free radical initiators having at least a 10 hour half life at a 100° C. are required for the reaction at about 110° C.-150° C. and include those having a boiling point above 110° C. such as 2,5-dimethyl-2,5-di(t-butylperoxy) hexane, di-t-butyl peroxide, dicumyl peroxide, t-butylcumyl peroxide, t-butylperoxy maleic acid, t-butyl hydroperoxide, 2,2-di(t-butylperoxy) butane, ethyl-3,3-di(t-butylperoxy) butyrate, t-butylperoxy acetate, t-butylperoxy benzoate, n-butyl-4,4-bis(t-butylperoxy) valerate, 2,5-dimethyl-2,5-di(benzooylperoxy) hexane, di-t-butyl-diperoxy phthalate, t-amylperoxy benzoate, 2,5-dimethyl-2,5-bis(benzoylperoxy) hexane, 2,5-dimethyl-2,5-di(t-butylperoxy) hexyne-3, OO-t-butyl-O-(2-ethylhexyl) monoperoxy carbonate, and the like and mixtures of these initiators. In the precharge, the initiator is dissolved in between about 10 and 90% of the selected solvent and the overall concentration of initiator, or initiator mixture, with respect to total monomer, during the reaction is maintained and controlled to between about 0.2 and about 5 wt. %, preferably between about 0.5 and about 2 wt. %.

In the initial stage of the process, i.e. precharging and introduction of the monomeric component, at which some polymerization takes place, the use of a low temperature initiator or a mixture of low temperature and high temperature initiators is recommended. Such low temperature initiators include diacyl peroxides such as diacetyl peroxide, dibenzoyl peroxide, dilauroyl peroxide; peresters such as t-butylperoxy pivalate, t-butyl peroctoate, t-amylperoxy pivalate, t-butylperoxy-2-ethyl hexanolate; percarbonates such as dicyclo hexyl peroxy dicarbonate, as well as azo compounds such as 2,2'-azo-bis(isobutyrolnitrile), 2,2'-azo-bis(2,4-dimethyl-valeronitrite), 2,2'-azo-bis(cycanocyclohexane) and mixtures thereof, the organic peroxides being preferred.

The reaction is carried out under anhydrous conditions in the absence of oxygen which is maintained by purging the reaction zone with an inert gas, such as nitrogen, throughout the reaction. In carrying out the present process, the reactor is precharged under moderate conditions such as a temperature of between about 50° and about 90° C., preferably for lactam monomer reaction, between about 60° and about 70° C., with a polymerization inducing amount of the low temperature free-radical initiator or high and low temperature initiator mixture dissolved in the nonpolar solvent selected for the reaction. The monomer or monomeric mixture in solution is then introduced, e.g. gradually within a period of 1-6 hours, into the reactor and contacted with the precharged solution under vigorous agitation, e.g. by agitation with a high shear mixing device operating at from about 100-800 rpm and the resulting mixture is then heated to reaction temperature at between about 110° and about 150° C., preferably between about 115° and about 135° C. It is essential that the high temperature initiator be present at this stage of the reaction. Hence, in cases where it is absent in the precharge of initiator solution, the high temperature initiator is introduced at this stage. The pressure in the reactor during polymerization may vary from atmospheric up to 100 psi, more often between about atmospheric and about 50 psi, depending upon the monomeric species selected Although the total initiator solution can be added as the precharged mixture, it is more desirable to add initiator solution throughout the reaction either by gradual addition or at separate stages of conversion as desired. In the preferred operation, it is best to contact the reaction mixture initially or with additional high temperature initiator solution after at least 50% of the monomers are converted to the polymeric product.

The polymerization temperature of this invention is critical since a minimum of 110° C. is needed to activate the high temperature initiator; whereas, above 150° C., as the temperature approaches the Tg of the polymer, the product is formed as a gelatinous mass in place of the desired finely divided particles.

The polymerization reaction is carried out over a period of from about 2 to about 48 hours, more often a reaction time of from about 6 to about 12 hours is sufficient to achieve complete conversion of the monomeric species. Toward the end of the reaction, the polymerization mixture may become too viscous for good agitation. In this case, additional solvent can be introduced to reduce the solids level below 10%. However, this step is optional. Another expedient which improves contact between the monomer and initiator involves introducing the monomeric species below the level of the initiator solution in the reactor.

After polymerization is completed the reactor is cooled and the contents withdrawn and the solvent removed by drying at a temperature of between about 80° C. and about 120° C. to recover the desired granulated particulate product containing less than 1,000 ppm (less than 0.1 wt. %), preferably less than 400 ppm, of residual monomer.

A major advantage of the present process is the ability to produce polymer containing no more than trace amounts of lactam residual monomer, in which concentrations it does not alter or dilute the desired polymeric properties and has no toxic affect. Thus, the present products are particularly useful for cosmetic, medicinal and pharmaceutical applications. Another advantage achieved by the present polymerization operation is that the initiator precharge and high reaction temperature permits substantially quantitative conversion to pure homopolymers or to pure copolymers in ratios heretofore unachievable without significant contamination. Further advantages of the present process is the convenience of pure product recovery by solvent stripping.

Having thus generally described the invention, reference is now had to the accompanying examples which are provided to illustrate preferred embodiments, but which are not to be construed as limiting to the scope of the invention as more broadly set forth above and in the appended claims.

EXAMPLE 1

In a 2 liter, 4-necked reaction kettle equipped with a condenser, a constant speed (set at 170 rpm) mechanical stirrer with torque reading and anchor agitation (open radius of 4 and 5/6 inches), 2 dip tubes connected to 2 separate metering pumps, a nitrogen purge adaptor and a thermocouple connected to the temperature controller, 1,000 grams of heptane were charged and the reactor was heated to 65° C. in 60 minutes with nitrogen purge throughout the entire process. The reactor was held at 65° C. for 30 minutes, after which 520 microliters of t-butylperoxy pivalate (Lupersol 11) was added followed by addition of a solution of 150 grams of N-vinylpyrrolidone and 50 grams of acrylic acid over a period of 4 hours. After completion of the addition, the resulting solution was transferred to a 2 liter stainless steel high pressure reactor and 1 gram of 2,5-dimethyl-2,5-di(t-butylperoxy) hexane was added. The resulting mixture was heated to 130° C. under 50 psig within one hour and held at that temperature for an additional 8 hours with constant agitation. The reaction mixture was then cooled to room temperature and the reactor contents transferred to an oven wherein it was dried at 100° C. for 16 hours and then in a vacuum oven at 90° C. for an additional 16 hours after which a white powdery product of non-crosslinked poly(vinylpyrrolidone/acrylic acid) copolymer containing 0.04% (400 ppm) of total residual monomer, was recovered.

EXAMPLE 2

Example 1 was repeated except that cyclohexane was substituted for heptane. The white powdery N-vinylpyrrolidone/acrylic acid copolymer product obtained in this Example had a residual monomer content of 300 ppm.

EXAMPLE 3

In a 2-liter, 4-necked reaction kettle equipped with a condenser, a constant speed (set at 170 rpm) mechanical stirrer with torque reading and anchor agitator (open radius of 4 and 5/6 inches), 2 dip tubes connected to 2 separate metering pumps, a nitrogen purge adaptor and a thermocouple connected to the temperature controller, 1,000 grams of heptane and 1 gram of 2,5-dimethyl -2,5-di(t-butylperoxy) hexane were charged and the reactor heated to 65° C. in 30 minutes with nitrogen purge throughout the entire process. The reactor was held at 65° C. for 30 minutes after which 520 microliters of t-butylperoctoate was added followed by addition of 150 grams of N-vinyl caprolactam and 50 grams of acrylic acid over a period of 4 hours. After completion of the addition, the reaction mixture was transferred to a 2-liter stainless steel high pressure reactor wherein it was reacted at 130° C. under 50 psig over a period of 8 hours with constant agitation. The reaction mixture was then cooled to room temperature and the reactor contents transferred to an oven wherein it was dried at 100° C. for 16 hours and then in a vacuum oven at 90° C. for an additional 16 hours, after which a white powdery product of poly(vinyl caprolactam/acrylic acid), containing about 500 ppm residual monomer was recovered.

COMPARATIVE EXAMPLE 4

In a 2 liter, 4-necked reaction kettle equipped with a condenser, a constant speed (set at 170 rpm) mechanical stirrer with torque reading and anchor agitation (open radius of 4 and 5/6 inches), 2 dip tubes connected to 2 separate metering pumps, a nitrogen purge adaptor and a thermocouple connected to the temperature controller, 1,000 grams of heptane were charged and the reactor was heated to 65° C. in 60 minutes with nitrogen purge throughout the entire process. The reactor was held at 65° C. for.30 minutes, after which 520 microliters of t-butylperoxy pivalate (Lupersol 11) was added followed by addition of a solution of 150 grams of N-vinylpyrrolidone and 50 grams of acrylic acid over a period of 4 hours. After completion of the addition, the mixture was heated to 85° C. for 1 hour after which t-butylperoxy pivalate (200 microliters) was charged each hour for an additional 4 hours at 85° C. to complete the reaction. The reaction mixture was then cooled to room temperature, filtered and washed twice with heptane, after which it was dried in an oven at 100° C. for 16 hours and then in an oven at 90° C. for an additional 16 hours, whereupon 92% yield of a white powdery product of N-vinylpyrrolidone/acrylic acid copolymer containing 0.5 wt. % (5,000 ppm) of residual monomer, was recovered.

EXAMPLE 5

Into a 2 liter, stainless steel reactor equipped with a condenser, a mechanical stirrer, 2 tubes connected to separate metering pumps, a nitrogen purge and a thermocouple connected to the temperature controller, are charged 1,000 grams of heptane and 520 microliters of t-butylperoxy pivalate (Lupersol 11) and the reactor heated to 65° C. in 60 minutes with nitrogen purge throughout the entire process. The reactor is held at 65° C. for 30 minutes, after which is added a solution of 200 grams of N-vinylpyrrolidone over a period of 4 hours. After completion of the addition, 1 g of 2,5-dimethyl-2,5-di -(t-butylperoxy) hexane (Lupersol 101) is added and the resulting solution is heated to 130° C. under a developed pressure of 50 psi within one hour and held at that temperature for an additional 8 hours with constant agitation. The reaction mixture is then cooled to room temperature and the reactor contents transferred to an oven wherein it was dried at 100° C. for 16 hours and then in a vacuum oven at 90° C. for an additional 16 hours after which a white powdery homopolymeric product of non-crosslinked poly(vinylpyrrolidone) containing 0.02% (200 ppm) of residual monomer, is recovered.

EXAMPLE 6

Into a 2 liter, stainless steel reactor equipped with a condenser, a mechanical stirrer, 2 tubes connected to separate metering pumps, a nitrogen purge tube and a thermocouple connected to the temperature controller, are charged 1,000 grams of heptane and 520 microliters of a 50/50 mixture of dicumyl peroxide and t-butylperoxy pivalate (Lupersol 11) and the reactor heated to 65° C. in 60 minutes with nitrogen purge throughout the entire process. The reactor is held at 65° C. for 30 minutes, after which is added a solution of 185grams of N-vinylpyrrolidone and 15 grams of styrene over a period of 4 hours. After completion of the addition, the resulting solution is heated to 130° C. under 60 psi within one hour and held at that temperature for an additional 10 hours with constant agitation. The reaction mixture is then cooled to room temperature and the reactor contents transferred to an oven wherein it was dried at 100° C. for 16 hours and then in a vacuum oven at 90° C. for an additional 16 hours after which a white powdery product of non-crosslinked poly(vinylpyrrolidone/styrene) copolymer containing a trace of residual monomer, is recovered.

EXAMPLE 7

Into a 2 liter, 4-necked reaction kettle equipped with a condenser, a constant speed (set at !70 rpm) mechanical stirrer with torque reading and anchor agitation (open radius of 4 and 5/6 inches), 2 tubes connected to separate metering pumps, a nitrogen purge adaptor and a thermocouple connected to the temperature controller, 1,000 grams of heptane are charged and the reactor was heated to 90° C. in 60 minutes with nitrogen purge throughout the entire process. The reactor is held at 90° C. for 30 minutes, after which 450 microliters of a 50/50 mixture of t-butylperoxy pivalate (Lupersol 11) and t-butylperoxy benzoate is added followed by addition of a solution of 150 grams of acrylamide over a period of 4 hours. After completion of the addition, the resulting solution was transferred to a stainless steel reactor equipped with a mechanical stirrer and heated to 120° C. under 40 psi within one hour holding at that temperature for an additional 6 hours with constant agitation and an additional 70 microliters of t-butylperoxy benzoate initiator is then added and the reaction continued under agitation at 120° C. for an additional 3 hours. The reaction mixture then cooled to room temperature and the reactor contents transferred to an oven wherein it was dried at 100° C. for 16 hours and then in a vacuum oven at 90° C. for an additional 16 hours after which a white powdery product of non-crosslinked polyacrylonitrile containing 0.05% (500 ppm) of residual monomer, is recovered.

EXAMPLE 8

Into a 2 liter, stainless steel reactor equipped with a condenser, a mechanical stirrer, 2 tubes connected to separate metering pumps, a nitrogen purge tube and a thermocouple connected to the temperature controller, are charged 1,000 grams of heptane, and 15 grams of acrylamide and the reactor heated to 90° C. in 60 minutes with nitrogen purge throughout the entire process. The reactor is held at 90° C. for 30 minutes, then 520 microliters of a 50/50 mixture of dicumyl peroxide and t-butylperoxy pivalate (Lupersol 11) is added after which a solution of 185 grams of acrylic acid is introduced over a period of 4 hours. After completion of the addition, the resulting solution is heated to 130° C. under 60 psi within one hour and held at that temperature for an additional 10 hours with constant agitation. The reaction mixture is then cooled to room temperature and the reactor contents transferred to an oven wherein it was dried at 100° C. for 16 hours and then in a vacuum oven at 90° C. for an additional 16 hours after which a white powdery product of non-crosslinked poly(acrylic acid/acrylamide) copolymer containing a trace of residual monomer, is recovered.

It is to be understood that many alterations, modifications and substitutions can be made in the above examples without departing from the intended scope of this invention. For example, any other of the aforementioned solvents can be substituted to provide the liquid medium of the reaction and any of the aforedescribed copolymeric mixtures can be substituted in Examples 1–3 and 5–8 to provide the corresponding particulate copolymeric products containing not more than 500 ppm residual monomer. Finally, any of the other high temperature initiators set forth above can be used in these examples.

What is claimed is:

1. A heterogeneous precipitation polymerization process which comprises:
    (a) precharging a reactor with a polymerizing amount of a polymerization initiator solution consisting essentially of a low temperature, free radical initiator having a 10 hour half-life at a temperature below 100° C. and a high temperature free radical initiator having at least a 10 hour half-life at a temperature of 100° C., dissolved in an inert non-polar solvent to provide a preformed polymerization initiator solution,
    (b) contacting a solution of a monomer component capable of precipitation upon being polymerized and being selected from the group consisting of N-vinylpyrrolidone, N-vinylcaprolactam, alkyl substituted N-vinylpyrrolidone and alkyl substituted N-vinylcaprolactam, optionally in the presence of a crosslinking amount of a crosslinking agent, with the precharged solution of (a) at a temperature of from about 50° C. to about 90° C. until a major portion of the monomer component is converted to solid polymer,
    (c) contacting the resulting heterogeneous polymerization reaction mixture at a temperature of between about 110° and about 150° C. under a pressure of from atmospheric to about 100 psi to complete the polymerization reaction and
    (d) recovering a precipitated particulate polymer as the product of the process.

2. The process of claim 1 wherein the concentration of said high temperature initiator in said reacting mixture is maintained at from about 0.2 to about 5 wt. % of said mixture.

3. The process of claim 1 wherein the initiator solution is precharged at a temperature between about 60° and about 70° C.

4. The process of claim 1 wherein the monomeric species contains N-vinylpyrrolidone.

5. The process of claim 1 wherein the monomeric species contains N-vinyl caprolactam.

6. The process of claim 4 wherein said solvent is cyclohexane.

7. The process of claim 4 wherein said solvent is heptane.

8. The process of claim 1 wherein said monomeric component is gradually added over a period of from about 1 to 6 hours.

9. The process of claim 8 wherein said monomeric component is contacted with said precharged initiator solution in step (b) at a temperature of between about 60° and about 70° C. and the temperature in step (c) is raised to between about 115° and about 135° C.

10. The process of claim 9 wherein said monomeric component contains at least a portion of N-vinylpyrrolidone.

11. The process of claim 9 wherein said monomeric component contains at least a portion of N-vinyl caprolactam.

12. The process of claim 10 wherein said solution of said monomer component contains a divinyl ether crosslinking agent.

* * * * *